United States Patent Office 3,256,293
Patented June 14, 1966

3,256,293
3-(PHENYLCARBAMOYL) BENZOXAZOLINONES-2
Joseph Willard Baker, Kirkwood, and Raymond Eugene Stenseth, Webster Groves, Mo., assignors to Monsanto Company, a corporation of Delaware
No Drawing. Filed Feb. 5, 1964, Ser. No. 342,821
6 Claims. (Cl. 260—307)

This invention relates to a novel class of substituted heterocyclic compounds. More particularly, this invention is concerned with a new class of organic compounds which are 3-(phenylcarbamoyl)benzoxazolinones-2. Such compounds are found to possess useful and unexpected biological activity.

The novel heterocyclics of this invention have the formula,

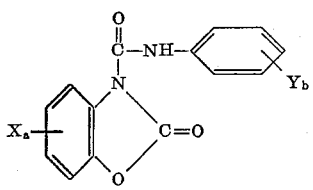

wherein each X and Y is selected from the group consisting of chlorine and bromine, $a$ is an integer from zero to four, $b$ is an integer from zero to three, and the sum of $a$ plus $b$ is at least one.

The halogenated compounds of this invention can be prepared by reacting benzoxazolinone-2 or a halogenated derivative thereof with phenyl isocyanate or a halogenated derivative thereof. As is apparent from the formula above, either or both of these reactants can be polyhalogenated whereby the reaction product can contain up to seven halogen substituents thereon. The reaction is preferably, although not necessarily, carried out in the presence of an inert organic solvent. It is also preferred, although not essential, to employ a small amount of a basic catalyst which serves to activate the acidic hydrogen atom on the benzoxazolinone. The reactants are usually heated gently to enhance their reactivity, but the reaction temperature should not exceed that at which the solvent, if employed, will reflux.

A typical illustrative reaction for preparing a compound of this invention is shown in the following equation:

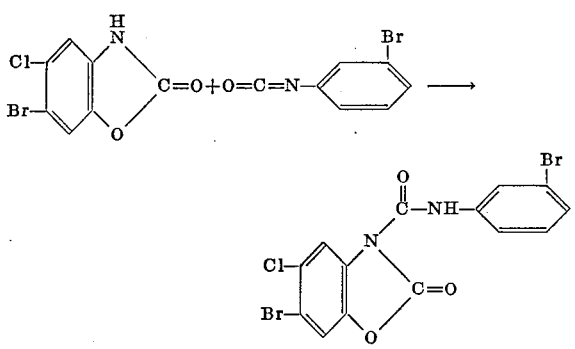

The invention will be more fully understood by reference to the following examples which are set forth herein solely for the purpose of illustration, and they are not to be construed as limiting the scope of the present invention.

Example I

A suitable reaction vessel is charged with an ether solution of 5.1 grams (0.025 mol) of 5,6-dichlorobenzoxazolinone-2 and about 10 cc. of pyridine. There is then added an ether solution of 4.7 grams (0.025 mol) of 3,4-dichlorophenyl isocyanate. The reactants are heated with stirring, and a solid begins to form after about 30 minutes. After about three hours, the heating is discontinued, and the mixture is allowed to cool. Said mixture is then filtered to yield 7.9 grams of a pinkish solid. Said solid is recrystallized from toluene as a white powder. This product is identified as 3-(3,4-dichlorophenylcarbamoyl)-5,6-dichlorobenzoxazolinone-2, M.P. 212–213° C.

Example II

Following the detailed procedure set forth in Example I, the reactants employed are 4.2 grams of 6-chlorobenzoxazolinone-2 and 5.6 grams of 3,4,5-trichlorophenyl isocyanate. The product obtained is 3-(3,4,5-trichlorophenylcarbamoyl)-6-chlorobenzoxazolinone-2.

Example III

Following the detailed procedure set forth in Example I, the reactants employed are 7.3 grams of 6,7-dibromobenzoxazolinone-2 and 4.9 grams of 4-bromophenyl isocyanate. The product obtained is 3-(4-bromophenylcarbamoyl)-6,7-dibromobenzoxazolinone-2.

Example IV

Following the detailed procedure set forth in Example I, the reactants employed are 4.2 grams of 5-chlorobenzoxazolinone-2 and 3.8 grams of 3-chlorophenyl isocyanate. The product obtained is 3-(3-chlorophenylcarbamoyl)-5-chlorobenzoxazolinone-2.

Example V

Following the detailed procedure set forth in Example I, the reactants employed are 5.9 grams of 4,5,6-trichlorobenzoxazolinone-2 and 2.9 grams of phenyl isocyanate. The product obtained is 3-(phenylcarbamoyl)-4,5,6-trichlorobenzoxazolinone-2.

Example VI

Following the detailed procedure set forth in Example I, the reactants employed are 3.3 grams of benzoxazolinone and 4.7 grams of 3,5-dichlorophenyl isocyanate. The product obtained is 3-(3,5-dichlorophenylcarbamoyl)benzoxazolinone-2.

Example VII

Following the detailed procedure set forth in Example I, the reactants employed are 6.8 grams of 4,5,6,7-tetrachlorobenzoxazolinone-2 and 4.7 grams of 3,4-dichlorophenyl isocyanate. The product obtained is 3-(3,4-dichlorophenylcarbamoyl) - 4,5,6,7 - tetrachlorobenzoxazolinone-2.

The products of the present invention are useful microbiocides adapted for use in the control of bacterial and fungal organisms. In a representative test, 3-(3,4-dichlorophenylcarbamoyl) - 5,6 - dichlorobenzoxazolinone-2 is found to be active against *Staphylococcus aureus* at a dilution in excess of one part per one hundred thousand and against *Aspergillus niger* at a dilution in excess of one part per ten thousand. Similar activity is displayed by other and different benzoxazolinones of this invention.

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A compound of the formula,

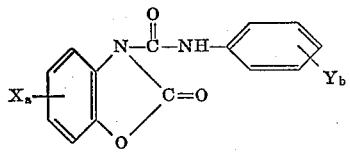

wherein each X and Y is selected from the group consisting of chlorine and bromine, $a$ is an integer from zero to four, $b$ is an integer from zero to three, and the sum of $a$ plus $b$ is at least one.

2. A compound of the formula,

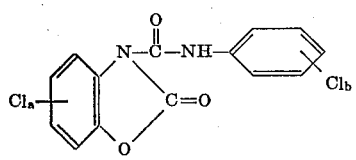

wherein $a$ is an integer from zero to four, $b$ is an integer from zero to three, and the sum of $a$ plus $b$ is at least one.

3. A compound of the formula, wherein $a$ is an integer from zero to four, $b$ is an integer from zero to three, and the sum of $a$ plus $b$ is at least one.

4. 3,(3,4 - dichlorophenylcarbamoyl)-5,6-dichlorobenzoxazolinone-2.

5. 3 - (3 - chlorophenylcarbamoyl) - 5,6-dichlorobenzoxazolinone-2.

6. 3 - (4 - chlorophenylcarbamoyl) - 5,6 - dichlorobenzoxazolinone-2.

References Cited by the Examiner

UNITED STATES PATENTS 3,119,833  1/1964  Sovish _____ 260—307.3

NICHOLAS S. RIZZO, *Primary Examiner.*

R. J. GALLAGHER, *Assistant Examiner.*